No. 744,483. PATENTED NOV. 17, 1903.
W. F. CARLBERG.
AUTOMATIC PUMP.
APPLICATION FILED JULY 25, 1903.
NO MODEL. 2 SHEETS—SHEET 1.

WITNESSES: INVENTOR
F. W. Riley. Walfred F. Carlberg.
Chas. S. Heyer. BY Victor J. Evans.
Attorney No. 744,483. PATENTED NOV. 17, 1903.
W. F. CARLBERG.
AUTOMATIC PUMP.
APPLICATION FILED JULY 25, 1903.
NO MODEL. 2 SHEETS—SHEET 2.
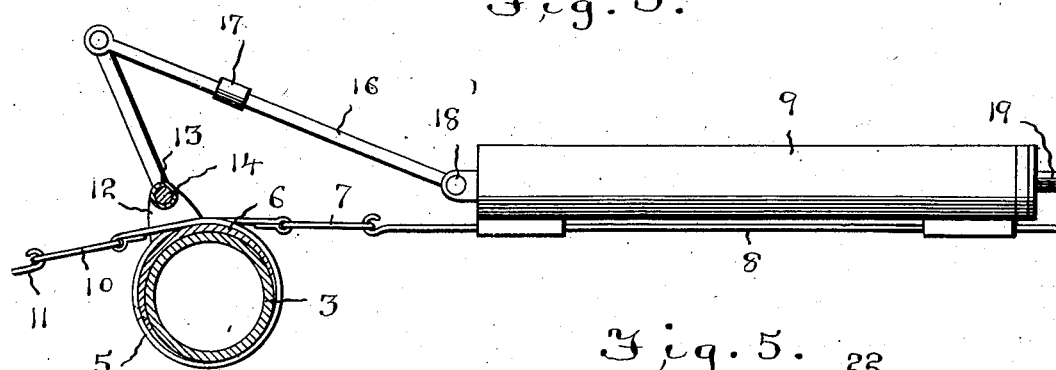
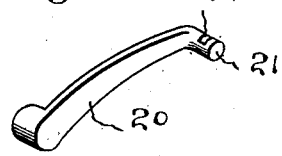
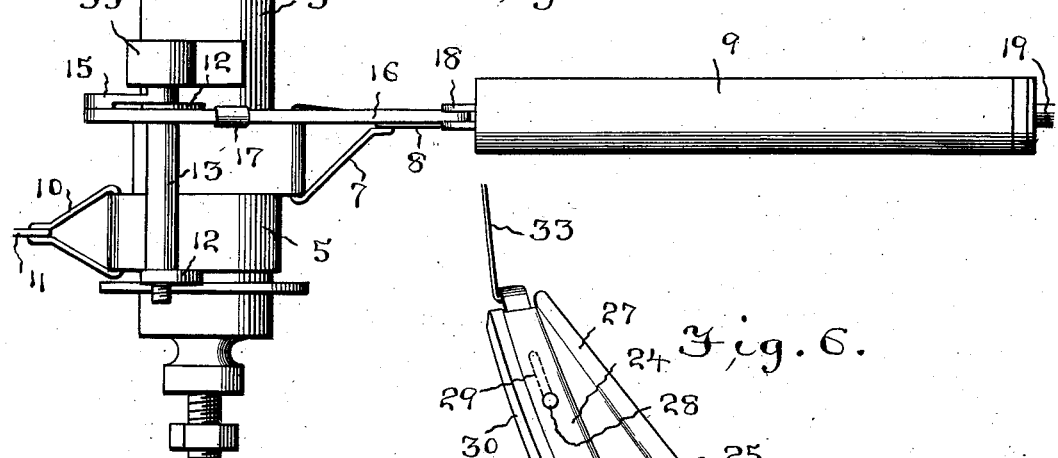
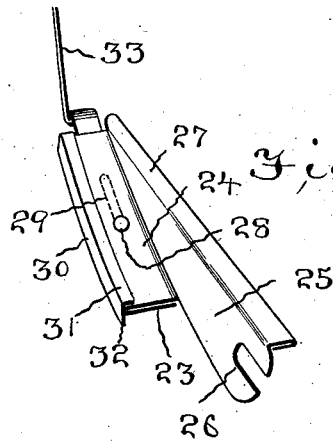
WITNESSES:
F. W. Riley
Chas. S. Hyer
INVENTOR
Walfred F. Carlberg.
BY Victor J. Evans
Attorney No. 744,483. Patented November 17, 1903.

UNITED STATES PATENT OFFICE.

WALFRED F. CARLBERG, OF SISSETON, SOUTH DAKOTA.

AUTOMATIC PUMP.

SPECIFICATION forming part of Letters Patent No. 744,483, dated November 17, 1903.

Application filed July 25, 1903. Serial No. 167,004. (No model.)

*To all whom it may concern:*

Be it known that I, WALFRED F. CARLBERG, a citizen of the United States, residing as Sisseton, in the county of Roberts and State of South Dakota, have invented new and useful Improvements in Automatic Pumps, of which the following is a specification.

This invention relates to automatic pumps for use in connection with pneumatic or inflatable tires for vehicles, the object in view being to equip a wheel of a vehicle with a pump which in the revolution of the wheel operates automatically to inflate the tire, so as to keep the latter in proper condition for use at all times.

A further object of this invention is to provide means under the ready control of the driver or rider whereby the stroke of the pump may be varied to inject a larger or smaller charge of air into the tire at each revolution; also to provide means whereby the pump may be entirely thrown out of gear or operation after the tire has been inflated to the proper degree of hardness.

With the above and other objects in view the invention consists in the novel construction, combination, and arrangement of parts as hereinafter fully described, illustrated, and claimed.

Figure 1:
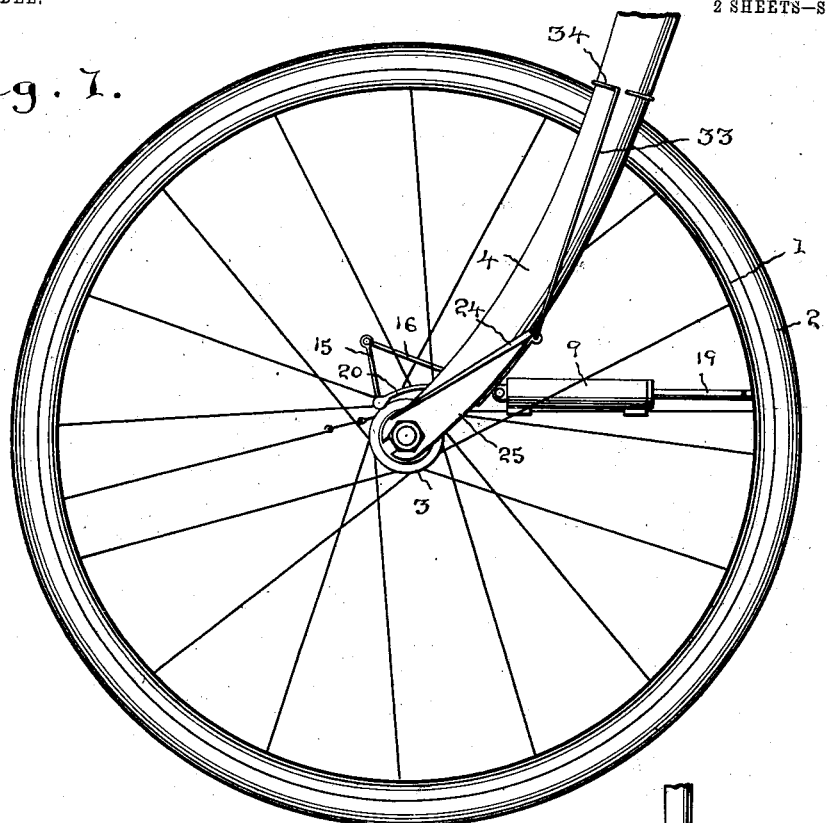
Figure 2:
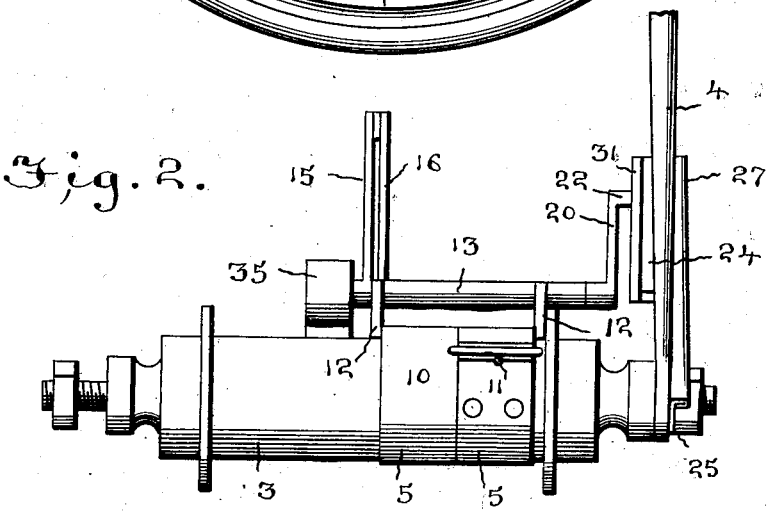

In the accompanying drawings, Figure 1 is a side elevation showing the automatic pump applied to the front or steering wheel of a bicycle. Fig. 2 is an enlarged plan view of the hub and adjacent parts of the pump-operating connections. Fig. 3 is an enlarged side elevation of the pump and some of its connections, showing the wheel-hub in section and the manner of mounting the parts thereon. Fig. 4 is a plan view of the parts shown in Fig. 3. Fig. 5 is a detail perspective view of the pump-lever, and Fig. 6 is a similar view of the cam-plate and its supporting-bracket.

Like reference-numerals designate corresponding parts in all figures of the drawings.

In order to illustrate the application and use of the present invention, I have shown the same as applied to the front or steering wheel of a bicycle in Fig. 1, in which 1 designates the rim; 2, a pneumatic tire; 3, the wheel-hub, and 4 one of the fork-blades of the steering-head of the machine. It will be apparent, however, as the description proceeds that the automatic pump forming the subject-matter of this invention is applicable to any vehicle-wheel equipped with an inflatable or pneumatic tire.

In carrying out the present invention I make use of a double strap or band 5, which extends around the hub 3, as shown in Fig. 3. The two portions or members of the band are firmly secured to a connecting yoke-plate 6, while the end of one band is connected, by means of a link 7, with a wire or rod 8, which extends outward and connects firmly to the wheel-rim and constitutes a guide upon which the pump-cylinder 9 slides back and forth toward and away from the wheel-rim. The extremity of the other member of the band 5 is connected by means of a link 10 with a stay 11, consisting of a wire or rod which extends outward and fastened to the rim, as shown in Fig. 1. By means of the guide 8 and stay 11 the two members of the band 5 and the yoke-plate 6 are held stationary with respect to the wheel and hub and are prevented from rotating thereon.

The yoke-plate 6 is provided with oppositely-arranged ears or lugs 12, connected by a bearing-sleeve 13, in which is journaled a crank-shaft 14. At one end this crank-shaft is provided with a crank 15, to which is attached a longitudinally-extensible rod 16, made extensible by means of a turnbuckle 17. The end of rod 16 is connected at 18 to the pump-cylinder 9, so as to move the cylinder lengthwise along the guide 8, the air compressed by the cylinder being forced through a tubular stem 19, which passes through the wheel-rim and communicates with the pneumatic tire, the air being thus forced into the tire in each revolution of the wheel.

The shaft 14 is provided at its opposite end with a pump-lever 20, having at its outer end a lateral extension 21, which is provided with a notch 22. The extension of the pump-lever is adapted to coöperate with a cam-plate 23, adjustable lengthwise upon the flange 24 of a bracket 25, secured to the machine-frame or, preferably, to the axle of the steering-wheel, said bracket being for that purpose provided with an end slot 26, which receives one end of the axle and enables the bracket to be firmly clamped in a fixed position by means of the use of a nut on the machine-axle. The bracket 25 is preferably formed of sheet metal having one edge thereof turned or rolled to form a reinforcing-bead 27, which gives the necessary strength to the bracket. Connected with the flange 24 is a pin 28, which works in a slot 29 in the cam-plate 23, thus allowing the cam-plate to be moved lengthwise a limited distance. The cam-plate is provided with a T-shaped flange 30 at its projecting edge, and one edge of said flange is turned over to form a lip 31, which embraces the flange 28 of the bracket, so as to hold the cam-plate in place against said flange while permitting the same to slide on the flange. Opposite the inturned lip 31 the flange 30 extends sufficiently away from the body of the cam-plate 23 to form a guide or rib 32, which works in the notch 22 in the lateral extension 21 of the pump-lever, so as to keep said pump-lever from sliding laterally off the cam-plate after it has once been brought into engagement therewith by the revolution of the wheel. In order to slide the cam-plate 23, a rod or stem 33 is connected to one end of said plate, which rod or stem extends upward along the fork-blade 4 and connects at its upper end with a slide or cam adjusting device 34, shown for convenience in the form of a ring or collar loosely surrounding the fork-blade, so as to move freely up and down thereon. By adjusting the cam-plate greater or less throw is given to the pump-lever 15 as the length of the surface upon which the extension 21 of the lever rides is increased or diminished thereby. In each revolution of the wheel the pump-lever is brought into engagement with the cam-plate, and after sliding lengthwise thereon the extension 21 of the lever passes beyond and over the end of the cam-plate. The engagement between the pump-lever and the cam-plate has the effect of forcing the pump-cylinder outward and forcing air into the tire. As soon as the pump-lever disengages the cam-plate the pump-cylinder is drawn backward toward the hub of the wheel by means of a retracting-spring 35, coiled around one end of the crank-shaft 14 and having one end in engagement with said shaft and the other end in engagement with the wheel-hub. By adjusting the cam-plate 24 sufficiently it may be moved out of the path of the pump-lever for the purpose of throwing the pump out of operation whenever the tire has been sufficiently inflated.

Having thus fully described my invention, what I claim as new, and desire to secure by Letters Patent, is—

1. An automatic pump for inflating wheel-tires, comprising a strap encircling the wheel-hub, a guide extending from said strap to the wheel-rim, a pump-cylinder mounted to slide lengthwise of said guide and adapted to force air into the tire, a crank-shaft mounted on the hub and operatively connected with the pump-cylinder, and a stationary cam-plate for operating said crank-shaft in each revolution of the wheel.

2. An automatic pump for vehicle-tires, comprising a strap connected with the wheel-hub, a guide extending from said strap to the wheel-rim, a stay extending from said strap in the opposite direction to the wheel-rim, a pump-cylinder mounted to slide on said guide and communicating with the tire, a crank-shaft held in place on the hub by said strap and operatively connected with the pump-cylinder, and a stationary cam-plate for operating said crank-shaft in each revolution of the wheel.

3. An automatic pump for vehicle-tires, comprising a strap encircling the wheel-hub, a guide extending from said strap to the rim, a stay extending from said strap in the opposite direction to the wheel-rim, a yoke-plate connected with said strap and held in fixed relation to the hub thereby, a crank-shaft journaled on said yoke-plate, a pump-cylinder movable lengthwise on the guide and in communication with the tire, operating connections between the crank-shaft and pump-cylinder, and a stationary cam-plate for operating said crank-shaft in each revolution of the wheel.

4. An automatic pump for vehicle-tires, comprising a band encircling the wheel-hub, a guide extending from said band to the wheel-rim, a stay extending from said band in the opposite direction and also connected with the wheel-rim, a pump-cylinder movable on said guide and communicating with the tire, a crank-shaft connected with said band and operatively connected with the pump-cylinder, and an adjustable cam-plate coöperating with said crank-shaft and adapted when adjusted to vary the throw of the pump-cylinder.

5. An automatic pump for vehicle-tires, comprising a strap encircling the wheel-hub, a crank-shaft connected to the hub by means of said strap and journaled thereon, a guide extending from said strap to the wheel-rim, a pump-cylinder movable on said guide and communicating with the tire, operating connections between the crank-shaft and pump-cylinder, a stationary bracket on the machine-frame, a cam-plate adjustable on said bracket and coöperating with the crank-shaft, and means within reach of the driver or rider for adjusting said cam-plate and thereby varying the throw of the pump-cylinder.

In testimony whereof I affix my signature in presence of two witnesses.

WALFRED F. CARLBERG.

Witnesses:
JOHN BARRINGTON,
JENNIE WHELDON.